United States Patent [19]

Toida et al.

[11] Patent Number: 5,691,584
[45] Date of Patent: Nov. 25, 1997

[54] WHEEL MOTOR FOR VEHICLES

[75] Inventors: Naoya Toida; Yoshiaki Kotani; Yoshihiro Iijima; Junji Okuda; Yoshihisa Hirose, all of Wako, Japan

[73] Assignee: Honda Giken Kogyo Kabushiki Kaisha, Tokyo, Japan

[21] Appl. No.: 299,595

[22] Filed: Sep. 1, 1994

[30] Foreign Application Priority Data

Sep. 9, 1993 [JP] Japan ................... 5-248706
Sep. 28, 1993 [JP] Japan ................... 5-264198

[51] Int. Cl.[6] ................................................. H02K 7/00
[52] U.S. Cl. ................... 310/67 R; 310/75 D; 180/65.5
[58] Field of Search ......................... 310/67 R, 75 C, 310/75 D, 75 R; 180/65.1, 65.5, 65.6, 65.7, 65.8

[56] References Cited

U.S. PATENT DOCUMENTS

| | | | |
|---|---|---|---|
| 2,726,726 | 12/1955 | Le Tourneau | 180/65.5 |
| 3,566,165 | 2/1971 | Lohr | 310/67 |
| 4,389,586 | 6/1983 | Foster et al. | 310/67 R |
| 5,127,485 | 7/1992 | Wakuta et al. | 180/65.5 |
| 5,236,055 | 8/1993 | Legal | 180/65.5 |
| 5,246,082 | 9/1993 | Alber | 180/65.5 |
| 5,289,890 | 3/1994 | Toyoda et al. | 180/65.8 |
| 5,341,892 | 8/1994 | Hirose et al. | 180/220 |

FOREIGN PATENT DOCUMENTS 2-11419  1/1990  Japan.
4-185207 7/1992  Japan.

*Primary Examiner*—Thomas M. Dougherty
*Assistant Examiner*—Jonathan Link
*Attorney, Agent, or Firm*—Frishauf, Holtz, Goodman, Langer & Chick

[57] ABSTRACT

A wheel motor for a vehicle is provided in which an electric motor is arranged in a central space defined in a wheel, to rotatably drive the wheel. A gear reducer is also arranged in the central space of the wheel, which has a plurality of gears including a final stage gear having an axial through hole formed therein. The electric motor includes a housing fixed to the vehicle body, a stator secured to the housing, a rotor rotatably fitted in a central space defined in the stator to generate the rotative driving force during rotation thereof, and an output shaft connected to the rotor through the gear reducer as well as to the wheel to be rotatively driven by the rotor, for transmitting the rotating output from the rotor through the gear reducer to the wheel. The output shaft extends through an axial through hole formed in the final stage gear of the gear reducer and an axial through hole formed in the rotor, and is rotatably supported by opposite end portions of the housing.

15 Claims, 10 Drawing Sheets

WHEEL MOTOR FOR VEHICLES

BACKGROUND OF THE INVENTION

1. Field of the Invention

This invention relates to a wheel motor for vehicles such as electric vehicles, fork lift trucks, and golf carts.

2. Prior Art

Wheel motors of this kind, which are equipped with reduction gears, specially require that an electric motor and a reduction gear should be mounted so as not to interfere with the body of a vehicle on which the wheel motor is mounted, when wheels of the vehicle move upward and downward or when they are turning. To meet such a requirement, wheel motors have been proposed, e.g. by Japanese Provisional Patent Publication (Kokai) No. 2-11419 and Japanese Provisional Patent Publication (Kokai) No. 4-185207, which are constructed such that an electric motor and an epicycle reduction gear are arranged in a central space defined by an inner periphery of a wheel, wherein a rotative driving force from the electric motor is transmitted through the reduction gear to the wheel to rotatively drive the same.

However, these conventional wheel motors employ epicycle reduction gears, which requires such a construction that an output shaft, which transmits the rotative driving force from the electric motor through the epicycle reduction gear to the wheel, is divided into two parts in the axial direction of the wheel such that the rotative driving force is first transmitted through one of the parts, and then through the reduction gear, to be then transmitted through the other part which is coaxial with the one part. As a result, the conventional wheel motor is complicated in construction and hence difficult to assemble. Besides, the output shaft necessarily has a short span along which it supports the wheel, etc. so that the supporting strength of the output shaft is too low to prevent the wheel including the tire from falling sideways.

Further, if the electric motor is formed by a brushless motor, the wheel motor has to be specially designed so as to mount a sensor for sensing the position of the rotor, which also makes the construction complicated.

Still further, the conventional wheel motors include a control circuit for driving the electric motor, which is mounted at a frame of the vehicle body on which the wheel motor is mounted, which requires provision of a space for mounting the control circuit, on the frame side. In addition, it requires arranging many electric lines such as a feeder line and signal lines extending between the vehicle body frame and the wheel motor to connect between the control circuit and the electric motor, which also results in increased lengths of these electric lines.

SUMMARY OF THE INVENTION

It is an object of the invention to provide a wheel motor for vehicles, which is simple in construction and easy to assemble, and has a long supporting span of an output shaft thereof so that the supporting strength of the output shaft is increased to a level enough to prevent the wheel from falling sideways.

It is a further object of the invention to provide a wheel motor for vehicles, which is light in weight and compact in size.

It is another object of the invention to provide a wheel motor for vehicles, which accommodates, within its housing, a sensor for sensing the position of the rotor and a control circuit board for driving the electric motor, while maintaining good environmental conditions for the sensor and the control circuit board.

To attain the first-mentioned object, the present invention provides a wheel motor for a vehicle having a vehicle body, comprising:

- a wheel having an inner peripheral portion defining a central space therein;
- an electric motor arranged in the central space of the wheel, for generating a rotating output for rotatively driving the wheel; and
- a gear reducer arranged in the central space of the wheel, the gear reducer having a plurality of gears including a final stage gear having an axial through hole formed therein in coaxial relation to an axis of rotation of the final stage gear;
- the electric motor including a housing fixed to the vehicle body and having opposite end portions; a stator secured to the housing and having an inner periphery defining a central space therein, a rotor rotatably fitted in the central space of the stator, for generating the rotating output during rotation thereof, the rotor having an axial through hole formed therein in coaxial relation to an axis of rotation of the rotor, and an output shaft connected through the gear reducer to the rotor to be rotatively driven thereby, the output shaft being drivingly connected to the wheel, for transmitting the rotating output from the rotor through the gear reducer to the wheel, the output shaft extending through the axial through hole of the final stage gear of the gear reducer and the axial through hole of the rotor, the output shaft being rotatably supported by the opposite end portions of the housing.

Preferably, the rotor has an increased diameter portion, and at least one reduced diameter portion provided at least at one end of the increased diameter portion, the at least one reduced diameter portion of the rotor being rotatably supported by the housing.

More preferably, the output shaft extends through the axial through hole of the rotor in a manner being out of contact therewith.

In a preferred embodiment of the invention, the output shaft having a hollow interior, and an axle shaft of the vehicle is rigidly fitted through the hollow interior of the output shaft.

Preferably, the output shaft extends through the housing, the output shaft having an extension disposed outside the housing.

To attain the second-mentioned object, the wheel motor according to the invention includes bearing means rotatably supporting the rotor on the output shaft.

If this bearing means is used, preferably the gear reducer comprises a double reduction gear.

To attain the third-mentioned object, the present invention provides a wheel motor in which the electric motor comprises a brushless electric motor having a magnet rotor forming the rotor, and sensor means for sensing a position of the magnet rotor,

- the housing comprising a first casing accommodating the electric motor, a second casing accommodating the gear reducer, and a partition member interposed between the first and second casings and separating them from each other, the partition member having first and second surfaces facing the first and second casings, respectively,
- the gear reducer having at least one gear of at least one predetermined reduction stage disposed in eccentricity with the output shaft, and a rotary shaft supporting the at least one gear of the at least one predetermined reduction stage, the partition member having a first mounting portion formed integrally on the first surface thereof, at which the stator of the electric motor is secured to the housing, and a second mounting portion formed integrally on the first surface thereof, at which the sensor means is mounted on the housing, the partition member having a supporting portion formed integrally on the second surface thereof and supporting the rotary shaft, the output shaft of the electric motor extending through the partition member and being rotatably supported by the first and second casings.

More preferably, the wheel motor includes a wall formed integrally on at least one of the second casing and the partition member and defining a space between the second casing and the partition member, the space being separated from a space portion of the second casing in which the gear reducer is arranged, and a control circuit accommodated in the space, for driving the electric motor.

Also preferably, the wall defines a space having a horseshoe-shaped configuration as the space, and a second space located inside the first-mentioned space, the second space accommodating the output shaft and the gear reducer.

To attain all the above objects, the present invention further provides a wheel motor for a vehicle having a vehicle body, comprising:

a wheel having an inner peripheral portion defining a central space therein;

an electric motor arranged in the central space of the wheel, for generating a rotating output for rotatively driving the wheel;

a gear reducer arranged in the central space of the wheel, the gear reducer having a plurality of gears including a final stage gear having an axial through hole formed therein in coaxial relation to an axis of rotation of the final stage gear;

the electric motor including a housing fixed to the vehicle body and having opposite end portions, a stator secured to the housing and having an inner periphery defining a central space therein, a rotor rotatably fitted in the central space of the stator, for generating the rotating output during rotation thereof, the rotor having an axial through hole formed therein in coaxial relation to an axis of rotation of the rotor, and an output shaft connected through the gear reducer to the rotor to be rotatively driven thereby, the output shaft being drivingly connected to the wheel, for transmitting the rotating output from the rotor through the gear reducer to the wheel, the output shaft extending through the axial through hole of the final stage gear of the gear reducer and the axial through hole of the rotor, the output shaft being rotatably supported by the opposite end portions of the housing; and bearing means rotatably supporting the rotor on the output shaft;

the electric motor comprising a brushless electric motor having a magnet rotor forming the rotor, and sensor means for sensing a position of the magnet rotor, the housing comprising a first casing accommodating the electric motor, a second casing accommodating the gear reducer, and a partition member interposed between the first and second casings and separating them from each other, the partition member having first and second surfaces facing the first and second casings, respectively, the gear reducer having at least one gear of at least one predetermined reduction stage disposed in eccentricity with the output shaft, and a rotary shaft supporting the at least one gear of the at least one predetermined reduction stage, the partition member having a first mounting portion formed integrally on the first surface thereof, at which the stator of the electric motor is secured to the housing, and a second mounting portion formed integrally on the first surface thereof, at which the sensor means is mounted on the housing, the partition member having a supporting portion formed integrally on the second surface thereof and supporting the rotary shaft, the output shaft of the electric motor extending through the partition member and being rotatably supported by the first and second casings.

The above and other objects, features, and advantages of the invention will be more apparent from the following detailed description taken in conjunction with the accompanying drawings.

DETAILED DESCRIPTION

Figure 1:
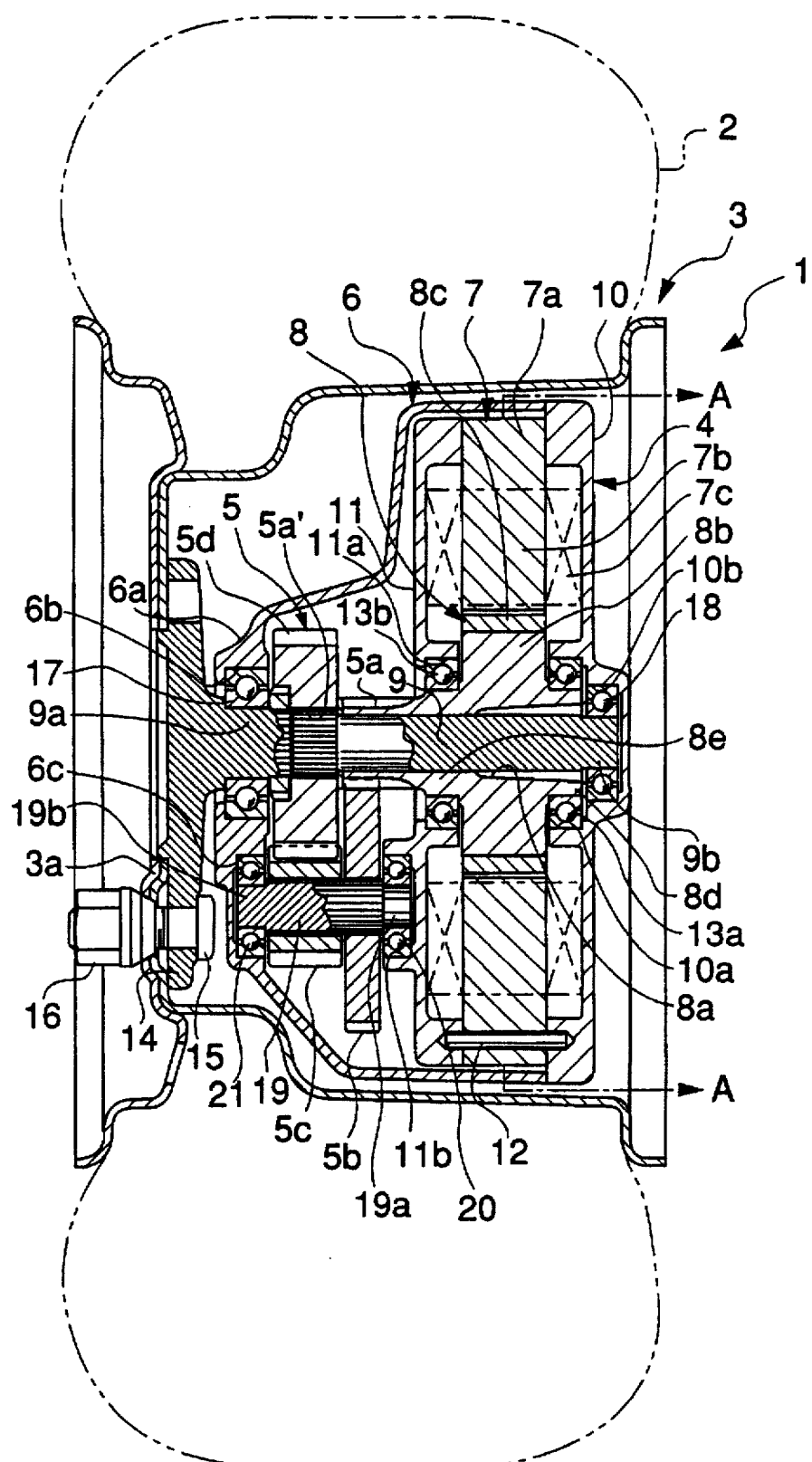
FIG. 1 is a longitudinal vertical sectional view showing the construction of a wheel motor according to a first embodiment of the invention.

The invention will now be described in detail with reference to the drawings showing preferred embodiments thereof. Throughout all the drawings showing the embodiments of the invention, corresponding elements and parts are designated by identical reference numerals.

Figure 2:
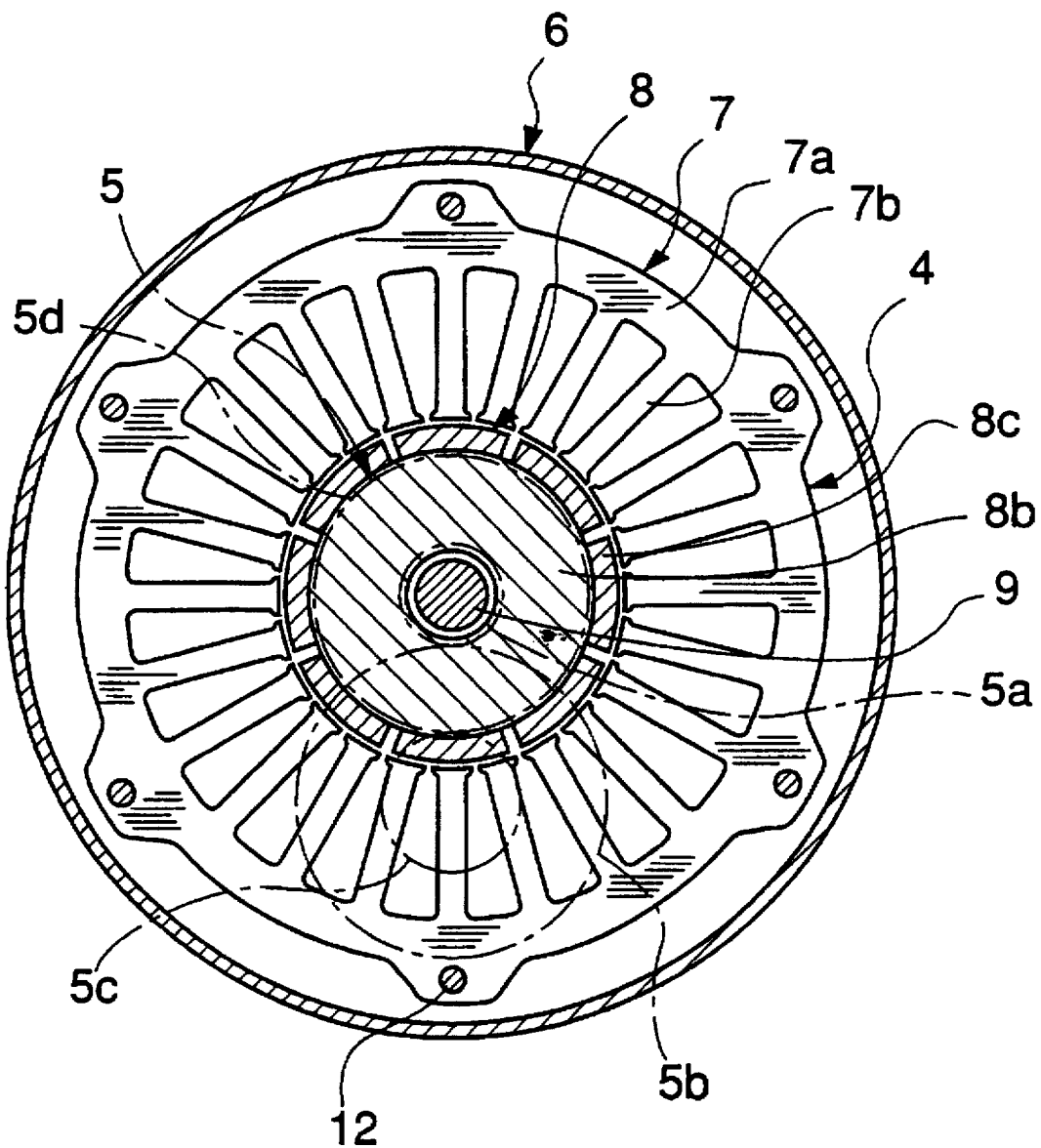
FIG. 2 is a longitudinal transverse sectional view taken along line A—A in FIG. 1.

First, a first embodiment of the invention will be described with reference to FIGS. 1 and 2. FIG. 1 shows the construction of a wheel motor according to the first embodiment. In the figure, reference numeral 1 designates a wheel motor, which includes an electric motor 4, and a gear reducer 5, which are arranged in a central space defined in a wheel 3 with a tire 2 by an inner periphery thereof. The electric motor 4 is drivingly connected through the gear reducer 5 to the wheel 3, whereby the wheel 3 is rotatively driven by a rotative driving force generated by the electric motor 4.

The electric motor 4 is comprised of a stator 7 fixed to a housing 6 arranged in the central space of the wheel 3, a rotor 8 rotatably arranged in a central space defined by an inner periphery of the stator 7, and an output shaft 9 disposed to transmit a rotating output (rotative driving force) from the rotor 8 through the gear reducer 5 to the wheel 3.

The housing 6 has a generally cap-shaped configuration and has a bottom 6a thereof formed with an axial through hole 6b. The housing 6 is fixed to a vehicle body, not shown, by a suitable fixing means.

The stator 7 has a stator main body 7a formed of a multiplicity of magnetic sheets each in the form of an annulus, which are stacked one upon another and formed integrally with a plurality of magnetic pole-forming projections 7b radially inwardly extending from an outer peripheral portion thereof at circumferentially equal intervals, and field coils 7c wound on the respective magnetic poles 7c. The stator 7 is arranged in a portion of the housing 6 remote from the bottom 6a thereof, in a manner being held at its opposite end surfaces between outer and inner covering members 10 and 11. The covering members 10, 11 are secured to marginal portions of the housing 6 remote from the bottom 6a thereof, and the stator 7 is secured to the covering numbers 10, 11 by means of fixing pins 12 at a plurality of points of its outer peripheral portion.

The rotor 8 has a rotor main body (enlarged diameter portion) 8b having an axial through hole 8a formed therein in coaxial relation to the axis of rotation of the rotor 8 and axially extending through the whole length of the rotor 8, a plurality of permanent magnet members 8c secured to an outer peripheral portion of the main body 8b at circumferentially equal intervals, and thinned portions (reduced diameter portions) 8d and 8e formed integrally with the main body 8b at opposite ends thereof. The main body 8b of the rotor 8 is rotatably fitted in the central space of the stator 7, in facing relation thereto. The thinned portions 8d, 8e are rotatably supported by the covering members 10, 11 by means of bearings 13a and 13b formed by ball bearings or the like, fitted, respectively, in central holes 10a and 11a defined by stepped shoulders of the covering members 10, 11. Thus, the outer peripheral portion of the rotor 8 is rotatably supported at its opposite ends by the housing 6 via the covering members 10, 11.

In this way, the stator 7 and the rotor 8 form the electric motor 4 thus fixed to the housing 6 in a manner being held between the covering members 10, 11.

The output shaft 9 has a fitting flange 14 formed integrally with an end portion 9a thereof, which is secured to a hub 3a of the wheel 3 by means of bolts 15 and nuts 16. The output shaft 9 is rotatably supported by the housing 6 such that the end portion 9a thereof is rotatably fitted in the axial through hole 6b of the housing 6 via a bearing 17 formed by a ball bearing or the like, and the other end portion 9b in a central recess 10b formed in the outer covering member 10 via a bearing 18 formed by a ball bearing or the like, respectively. The output shaft 9 extends through the axial through hole 8a of the rotor 8 in a manner being out of contact with the inner wall of the hole 8a.

The gear reducer 5 is accommodated within the housing 6. The gear reducer 5 is a double reduction type, which is comprised of a plurality of (four in the illustrated embodiment) gears 5a, 5b, 5c and 5d. The first gear 5a is formed integrally on a tip of the thinned portion 8e at one end portion (left end portion as viewed in FIG. 1) of the rotor 8, in concentricity with the rotor 8. The second and third gears 5b, 5c are both rigidly fitted on a common rotary shaft 19 located below the output shaft 9, for rotation in unison with each other. The second gear 5b is in mesh with the first gear 5a. The rotary shaft 19 is rotatably supported by the inner covering member 11 and the housing 6 such that an end portion 19a thereof is rotatably fitted in a recess 11b formed in the inner covering member 11 via a bearing 20 formed by a ball bearing or the like, and the other end portion 19b in a recess 6c formed in the housing 6 by a bearing 21 formed by a ball bearing or the like, respectively. The fourth or final stage gear 5d has an axial through hole 5d' formed therein in coaxial relation to the axis rotation of the gear 5d and rigidly fitted on the output shaft 9, which extends through the axial through hole 5d', for rotation in unison therewith. The fourth gear 5d is mesh with the third gear 5c. With the above stated arrangement, when the rotor 8 is rotated due to the action of a rotating magnetic field formed by the stator 7, the first gear 5a integral with the rotor 8 rotates together with the rotor 8, i.e. at the same rotational speed as the latter. A rotating output from the first gear 5a is transmitted through the second and third gears 5b, 5c while being reduced in speed, to the fourth gear 5d, whereby the output shaft 9 and the wheel 3 are rotated at the same rotational speed as the fourth gear 5d, i.e. at a reduced rotational speed, and in the same rotational direction as the rotor 8. For example, when the rotor 8 rotates in the positive direction at 750 rpm, the output shaft 9 and the wheel 3 rotate in the positive direction at a speed of 150 rpm as a result of speed reduction by the gear reducer 5.

Next, the operation of the wheel motor constructed as above will be described. When the stator 7 of the electric motor 4 is supplied with electricity, the rotor 8 rotates at a rotational speed of 750 rpm, for example. The rotating output from the rotor 8 has its speed reduced in two stages by the first to fourth gears 5a–5d of the gear reducer 5, and then transmitted to the output shaft 9, whereby the wheel 3 rotates together with the output shaft 9, at a rotational speed of 150 rpm, for example.

According to the present embodiment, the output shaft 9 of the electric motor 4 is rotatably supported by the opposite end portions of the housing 6, while the output shaft 9 extends through the axial through hole 5d'0 of the fourth gear 5d as the final stage gear of the gear reducer 5 and the axial through hole 8a of the rotor 8. As a result, it does not only make the construction simple but also makes it possible to assemble the wheel motor by fitting into respective places the component parts of the gear reducer 5, the inner covering member 11, the component parts of the electric motor 4, and the outer covering member 10, in the order mentioned, with reference to the output shaft 9, thus facilitating the assemblage. Further, the output shaft 9 is substantially supported by opposite end portions of the entire wheel motor, which can set the supporting span of the output shaft to a large value, thereby obtaining sufficient strength for supporting the wheel 3 including the tire 2 so as to prevent them from falling sideways.

A second embodiment of the invention will now be described with reference to FIG. 3, which shows the construction of a wheel motor according to the second embodiment. The wheel motor 1a according to this embodiment is distinguished from the first embodiment described above in that an axial through hole 10c is formed in a central portion of the outer covering member 10, and the output shaft 9 has a hollow interior 9c, through which an axle shaft 24 is fitted.

Figure 3:
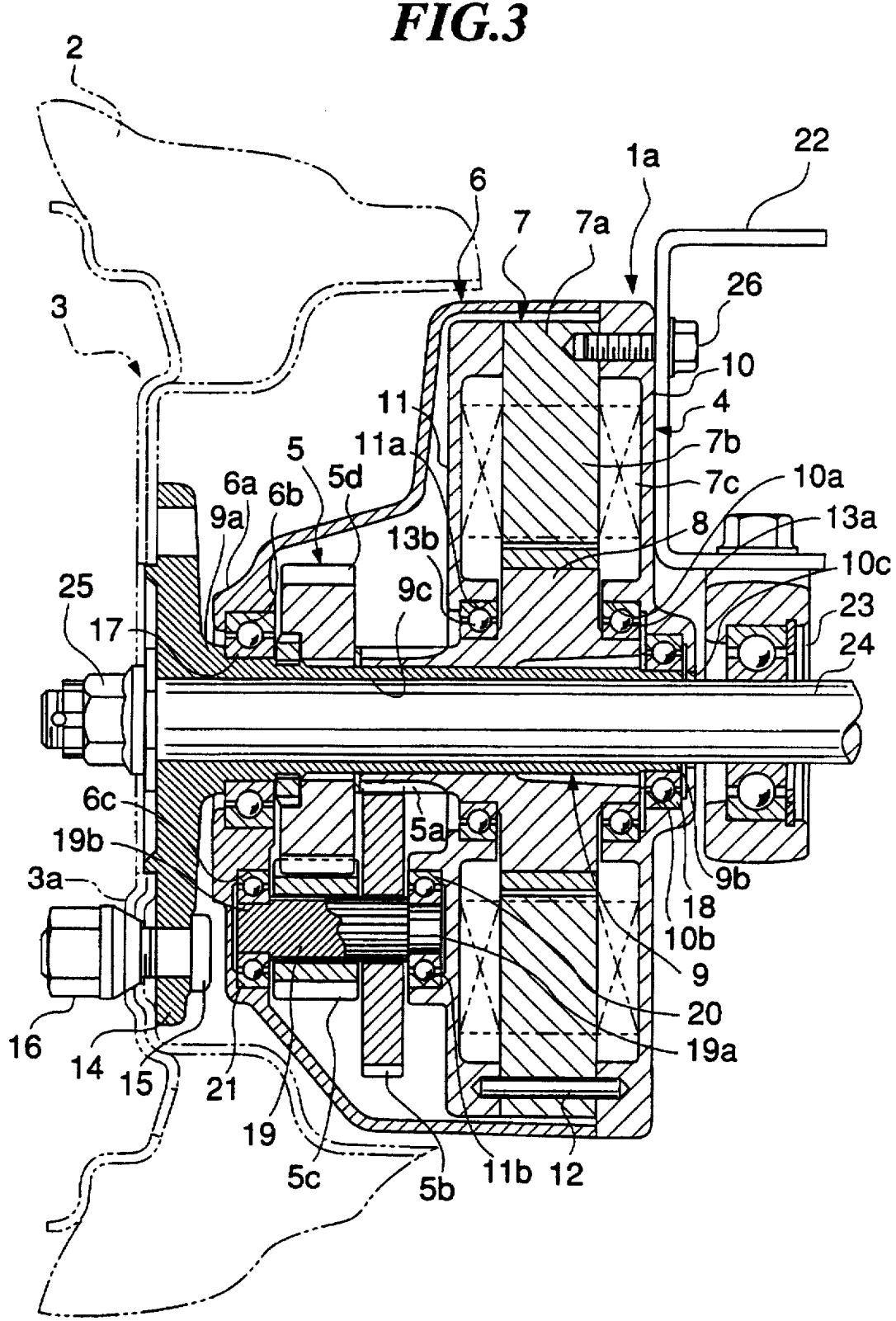
FIG. 3 is a longitudinal vertical sectional view showing the construction of a wheel motor according to a second embodiment of the invention.

More specifically, as shown in FIG. 3, the axle shaft 24 is supported by a bracket 22 mounted on the vehicle body via a bearing 23 formed by a ball bearing or the like and inserted into the hollow interior 9c of the output shaft 9 from the rotor 8 side such that an end portion of the axle shaft 24 extends out of the end portion 9a of the output shaft 9. A nut 25 is threadedly fitted on the exteriorly exposed end portion of the axle shaft 24 to tighten it together with the end portion 9a of the output shaft 9 and the wheel 3. The outer covering member 10 is secured by bolts 26 to the bracket 22. By virtue of this arrangement, it is possible to motorize a non-motorized work vehicle such as a hand truck in a simple manner by inserting the axle shaft 24 already provided in the non-motorized vehicle into the hollow interior 9c of the output shaft 9 to thus mount the wheel motor 1a into the body of the non-motorized vehicle.

The present embodiment is substantially identical in construction, operation, and effect with the aforesaid first embodiment, except for those described above, further description of which is therefore omitted.

Figure 4:
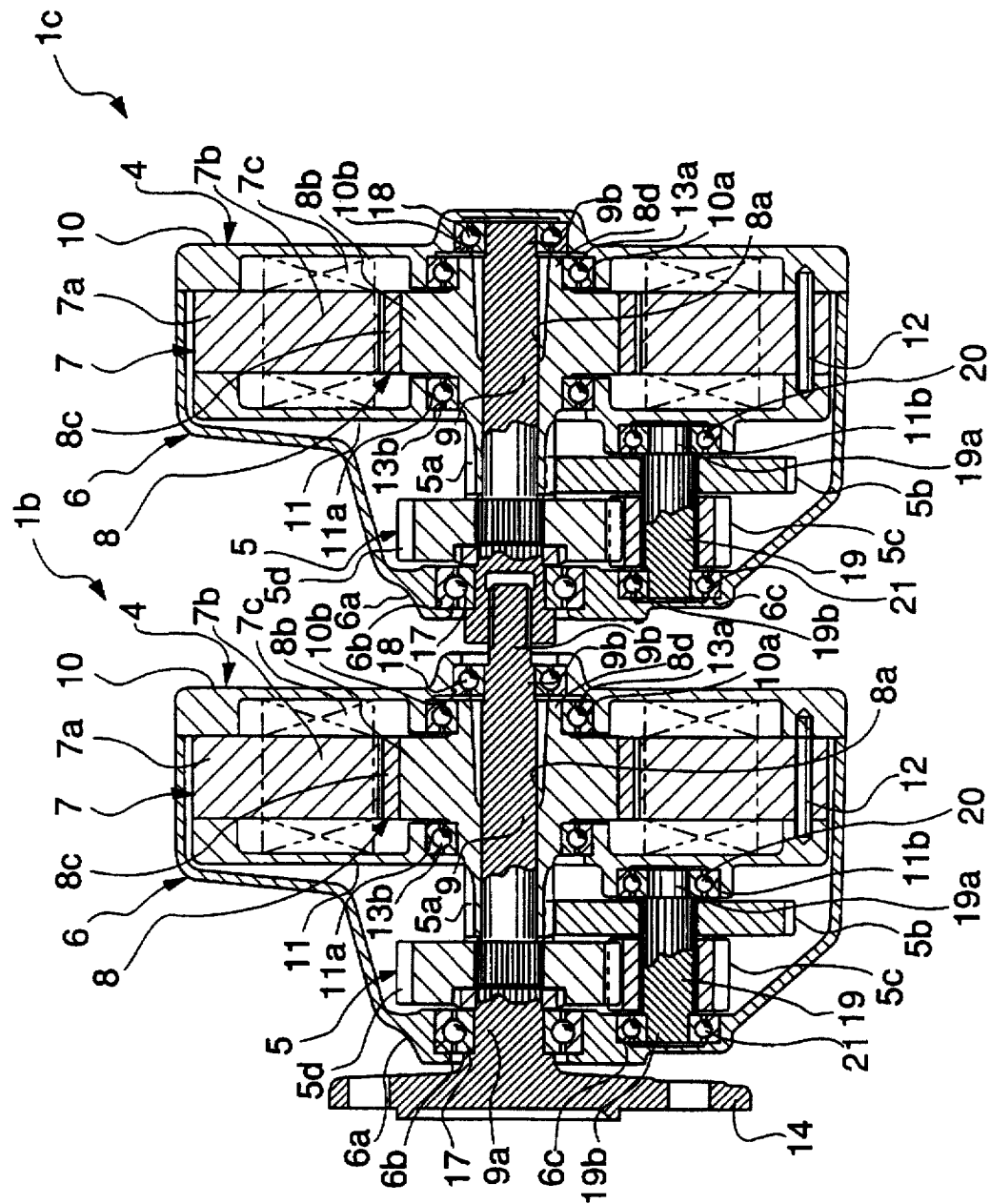
FIG. 4 is a longitudinal vertical sectional view showing the construction of a wheel motor according to a third embodiment of the invention.

A third embodiment of the invention will be described with reference to FIG. 4 showing the construction of a wheel motor according to the third embodiment. According to the present embodiment, output shafts of two wheel motors 1b and 1c are coupled together to obtain a large rotative driving force. More specifically, the end portion 9b of the output shaft 9 of the first wheel motor 1b has an extension 9b' which extends out of the central recess 10b of the outer covering member 10, while the fitting flange 14 at the end portion 9a of the output shaft 9 of the output shaft 9 of the second wheel motor 1c is omitted, and the extended portion 9b of the first wheel motor 1b is joined to the end portion 9a of the output shaft 9 of the second wheel motor 1c. By virtue of this construction, it is possible to cope with a demand for a wheel motor with a larger output power, merely by serially connecting the output shaft of the wheel motor according to the invention with an output shaft or output shafts of one or more wheel motors according to the invention or according to the prior art, instead of manufacturing a new wheel motor.

Also this embodiment is substantially identical in construction, operation, and effect with the aforesaid first embodiment, except for those described above, further description of which is therefore omitted.

Figure 5:
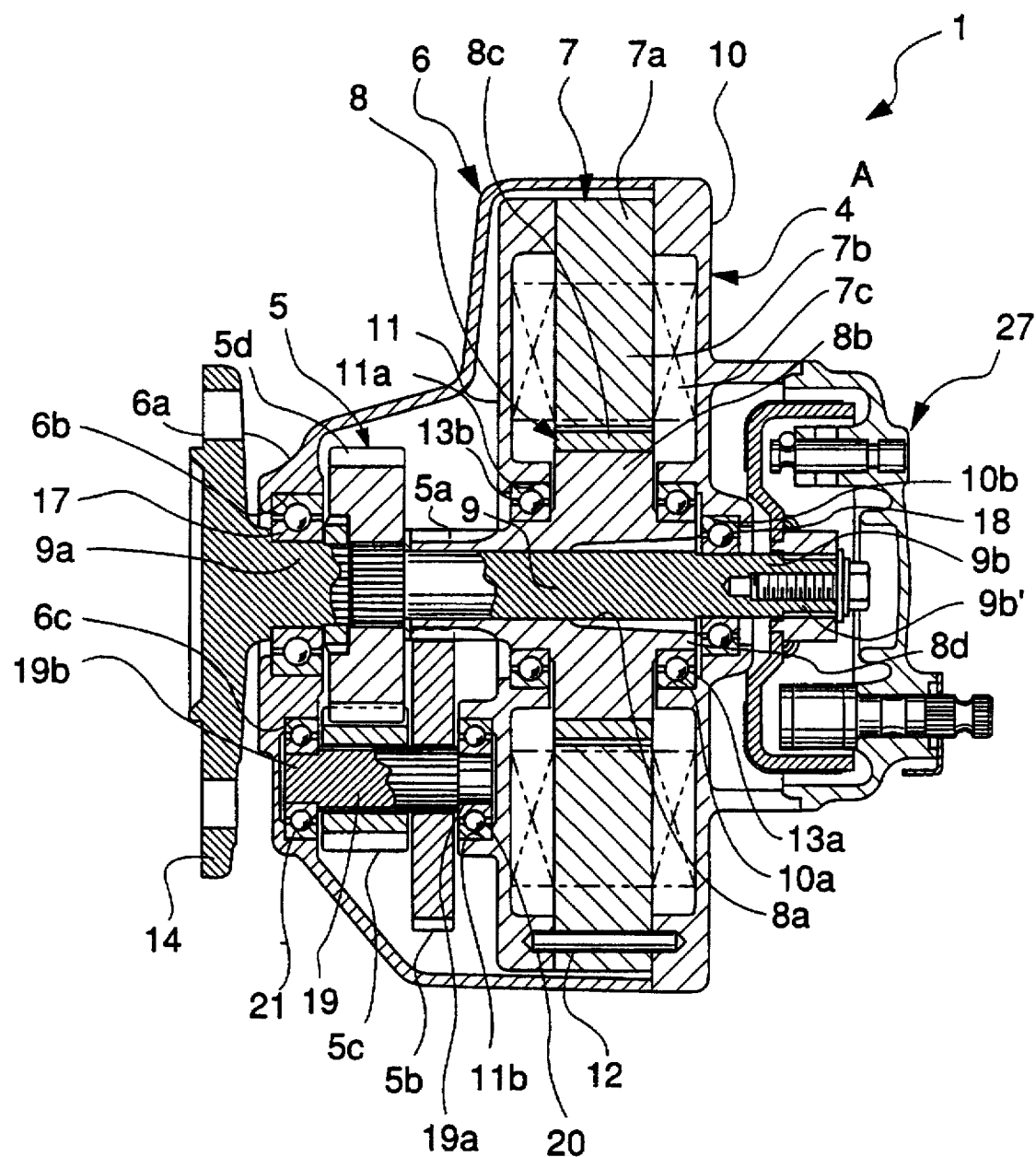
FIG. 5 is a longitudinal vertical sectional view showing the construction of a wheel motor according to a fourth embodiment of the invention.

Next, a fourth embodiment of the invention will be described with reference to FIG. 5 showing the construction of a wheel motor according to the fourth embodiment. According to this embodiment, a brake mechanism 27 is mounted on the end portion 9b of the output shaft 9. More specifically, the end portion 9b of the wheel motor 1 has an extension 9b' which extends out of the central recess 10b of the outer covering member 10, and on which is mounted the brake mechanism 27 for imparting a braking force to the output shaft 9 of the wheel motor 1.

Also this embodiment is substantially identical in construction, operation, and effect with the aforesaid first embodiment, except for those described above, further description of which is therefore omitted.

Figure 6:
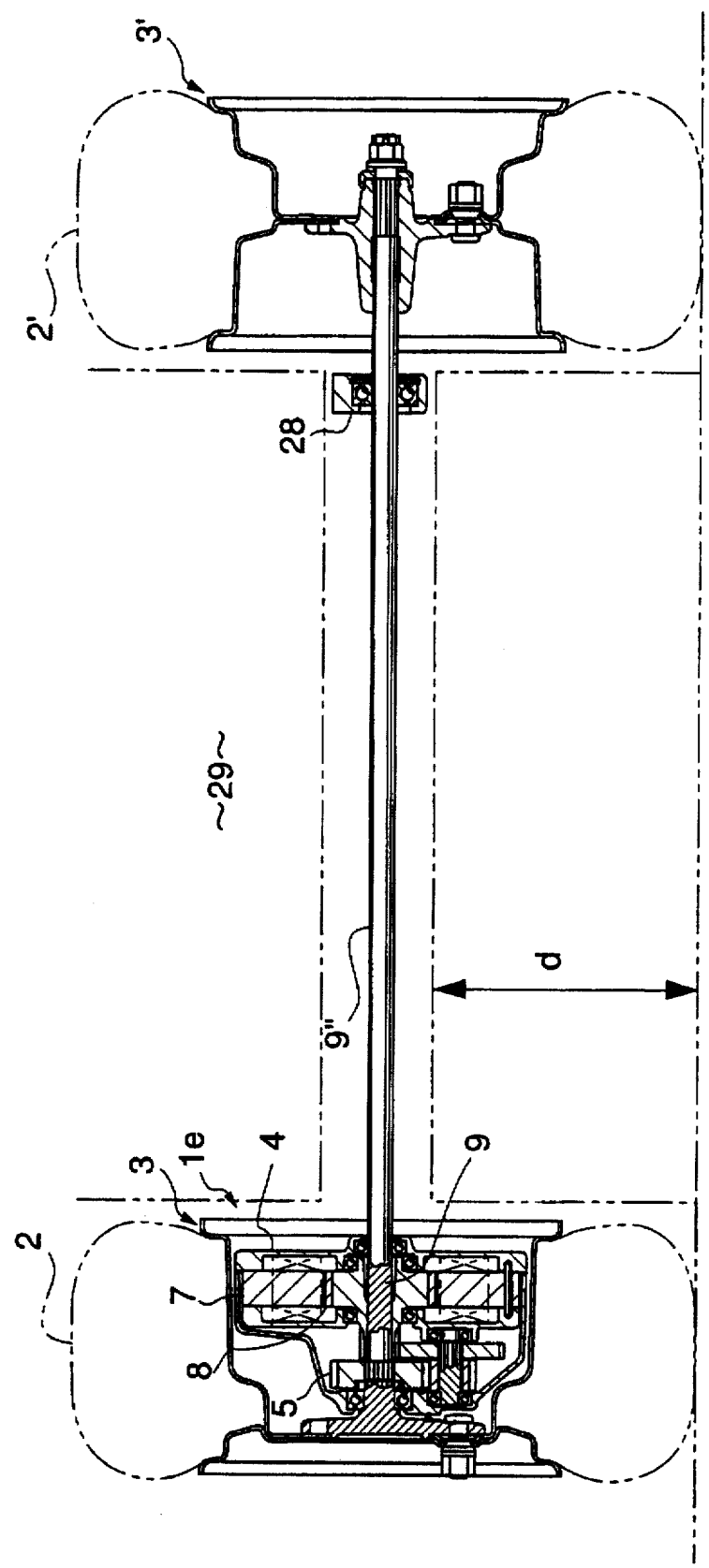
FIG. 6 is a longitudinal vertical sectional view showing the construction of a wheel motor according to a fifth embodiment of the invention.

A fifth embodiment of the invention will be described with reference to FIG. 6 showing the construction of a wheel motor according to the fifth embodiment. The wheel motor 1 according to this embodiment is a one motor/two wheel type wherein a second wheel 3' is mounted on an extension 9b" of the end portion 9b of the output shaft 9. More specifically, the output shaft 9 according to this embodiment has a far larger length than the output shafts according to the third and fourth embodiments described above. The output shaft 9 extends out of the central recess 10b of the outer covering member with an exteriorly disposed extension 9b" several times as long as the portion inside the wheel motor 1c. The second wheel 3' with a tire 2' is mounted on an end portion of the extension 9b". A bearing 28 formed by a ball bearing or the like is mounted on the vehicle body in the vicinity of the second wheel 3', to support the output shaft extension 9b" on the vehicle body. According to this construction, only the output shaft 9 and the bearing 28 exist between the two wheels 3, 3', while a drive means such as the electric motor need not be installed in a space 29 below the vehicle body. As a result, a large minimum height from the ground, i.e. the distance d from the ground to the output shaft can be obtained. Besides, the space 29 above the output shaft 9 can be utilized for mounting a battery or a loading space.

This embodiment is substantially identical in construction, operation, and effect with the aforesaid first embodiment, except for those described above, further description of which is therefore omitted.

Figure 7:
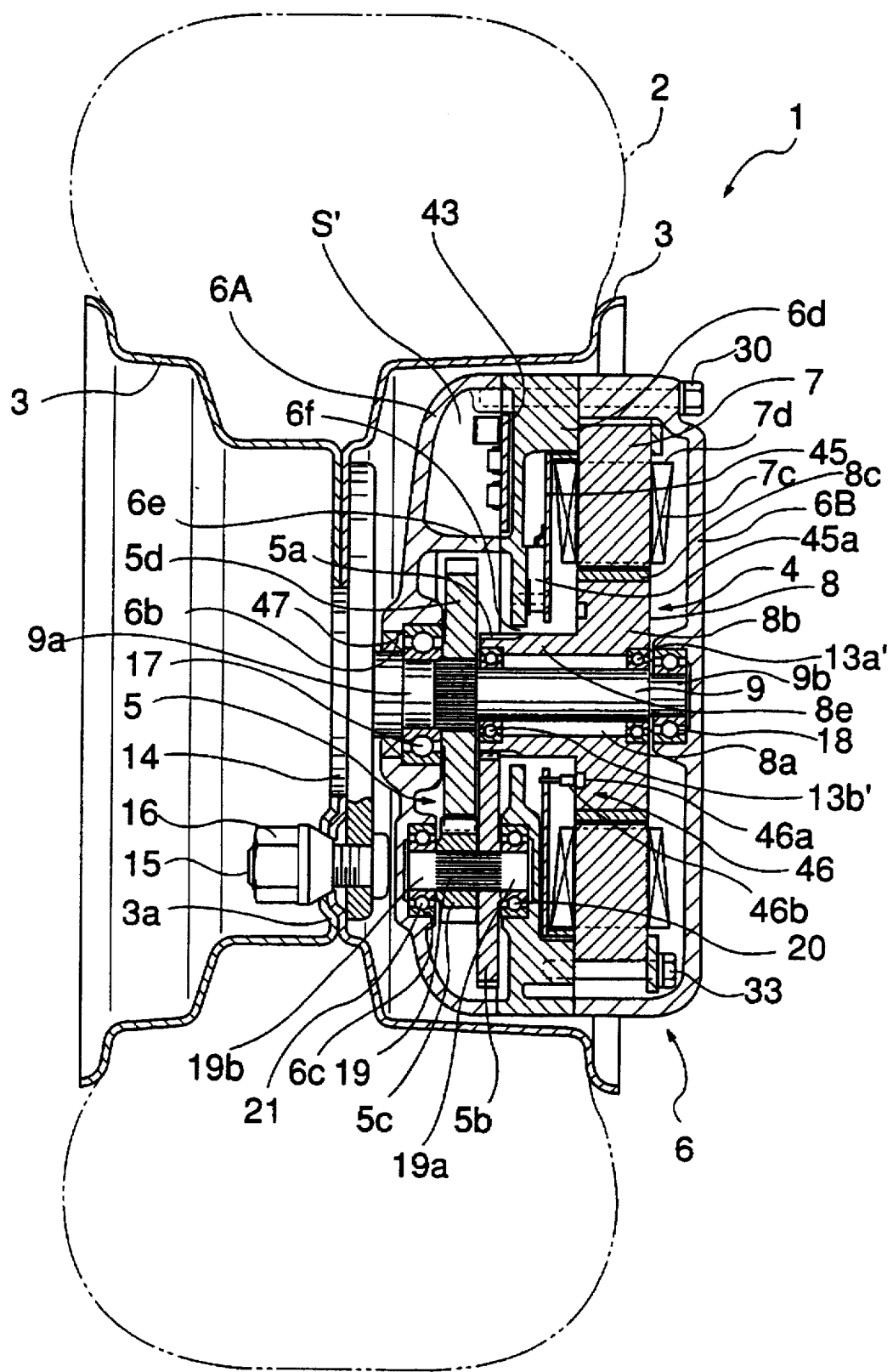
FIG. 7 is a longitudinal vertical sectional view showing the construction of a wheel motor according to a sixth embodiment of the invention.

A sixth embodiment of the invention will be described with reference to FIGS. 7–10. FIG. 7 shows the construction of a wheel motor according to the sixth embodiment. The housing 6 of the wheel motor 1 according to this embodiment is comprised of an outer casing 6A, an inner casing 6B, and a partition plate member 6d. The inner casing 6B and the partition plate member 6d are fastened together by means of bolts 30, and the outer casing 6A and the partition plate member 6d are fastened together by means of bolts 31 shown in FIG. 9. The outer and inner casings 6A, 6B and the partition plate member 6d are formed of die castings.

Figure 8:
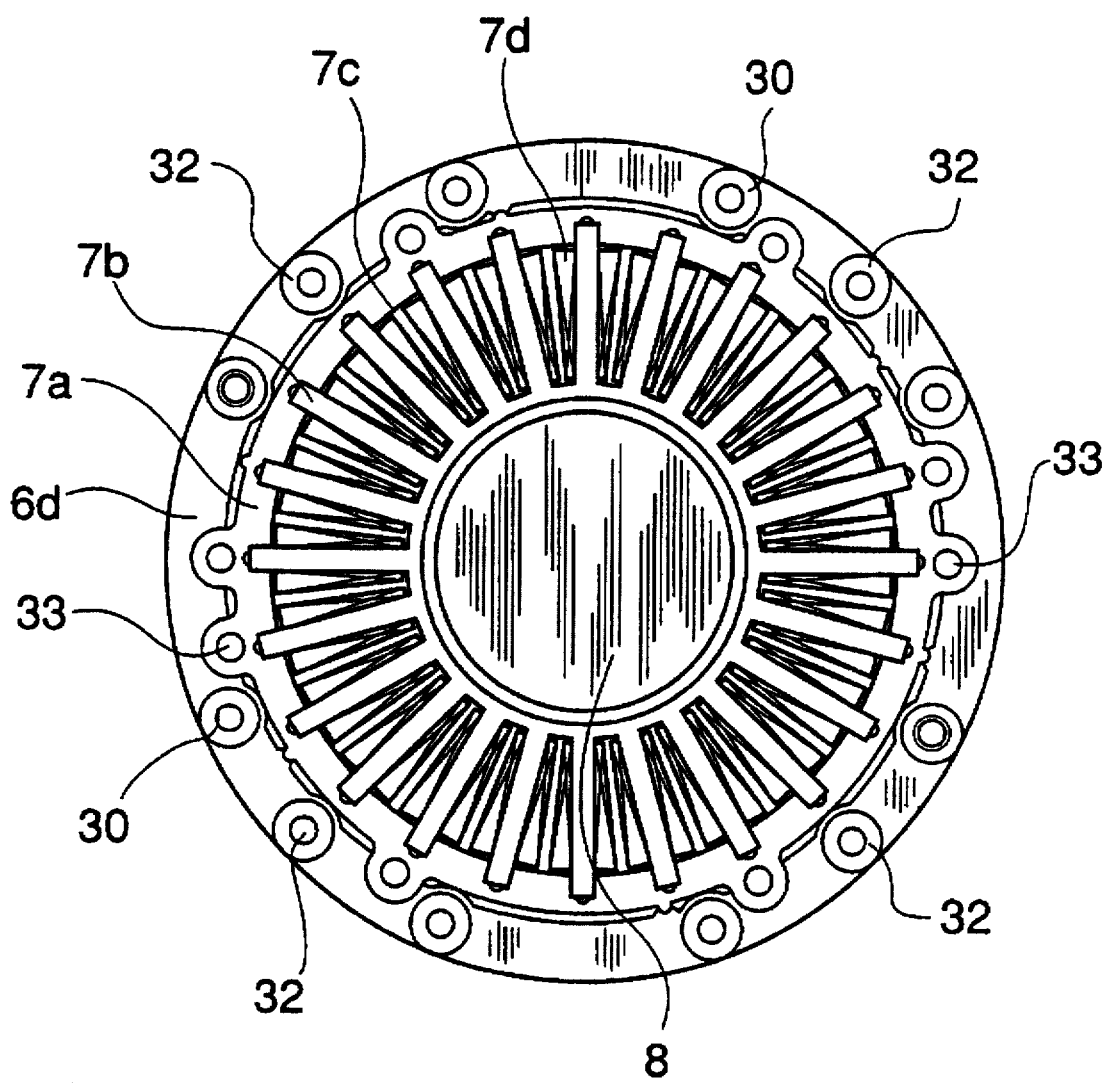
FIG. 8 is a transverse sectional view showing a section in FIG. 7 in which an electric motor is mounted.
Figure 9:
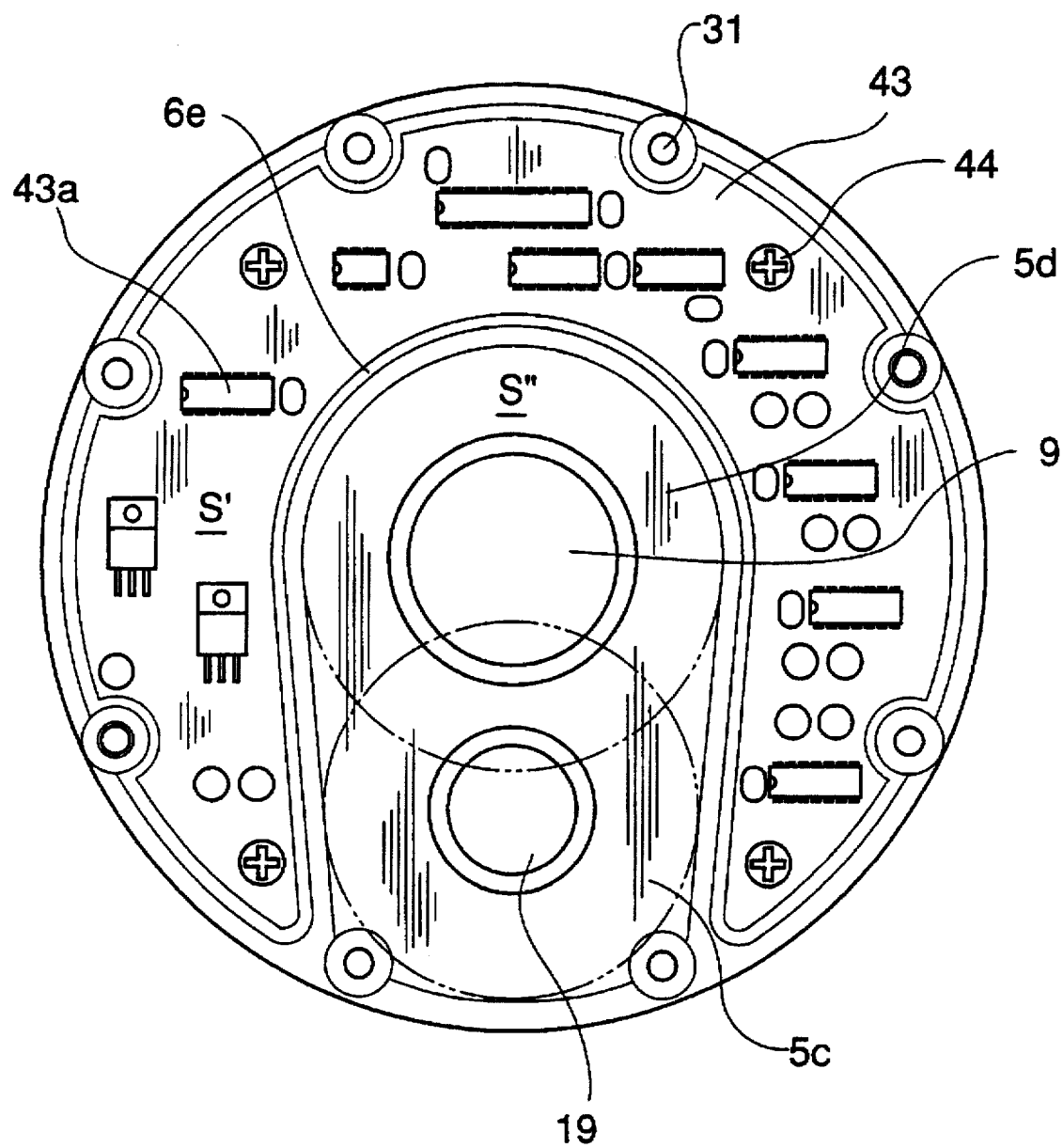
FIG. 9 is a transverse sectional view showing a section in FIG. 7 in which a first circuit board is mounted.

The outer casing 6A has a central portion thereof formed with an axial through hole 6b, and an integral partition wall 6e formed integrally on an inner side surface thereof (i.e. inside the housing 6), which defines a space S' having a horseshoe-shaped configuration (FIG. 9). The inner casing 6 is fixed to the vehicle body, not shown, by means of bolts 32 shown in FIG. 8.

The electric motor 4 is a brushless electric motor having a permanent magnet rotor 8, a three-phase stator winding (field coils 7c), and a position sensor 46 for sensing the position of the rotor 8. The stator 7 of the electric motor 4 is mounted within the inner casing 6B. The stator 7 has magnetic poles 7b of a main body 7a thereof on which the three-phase field coils 7c are wound via coil bobbins 7d, as shown in FIG. 8. The stator 7 is secured at a plurality of outer peripheral portions thereof to the partition plate member 6d by means of bolts 33.

The rotor 8 has a rotor main body (increased diameter portion) 8b, and a thinned portion (reduced diameter portion) 8e axially extending integrally from one end of the main body 8b and having a larger axial size than the latter. A tip of the thinned portion 8e is formed integrally with the first gear 5a of the gear reducer 5, similarly to the previous embodiments. The main body 8b, which is shorter in axial size than the thinned portion 8e, is rotatably fitted in a central space defined in the stator 7 by an inner periphery thereof, in facing relation thereto. The rotor 8 is rotatably supported on the output shaft 9 by means of bearings 13a' and 13b' formed by ball bearings or the like, which are force-fitted between the output shaft 9 and opposite ends of inner peripheral portions of the rotor 8, for rotation about and relative to the output shaft 9.

One end portion 9a of the output shaft 9 is rotatably supported in the axial through hole 6b of the outer casing 6A via a bearing 17 formed by a ball bearing or the like, and the other end portion 9b of the output shaft 9 in a central recess formed in the inner casing 6B via a bearing 18 formed by a ball bearing or the like, respectively. Thus, also in this embodiment, the output shaft 9 extends through the axial through hole 8a of the rotor 8 in a fashion being out of contact therewith. A seal member 47 is interposed between the axial through hole 6b of the outer casing 6A and the output shaft 9 to seal them again the outside. In this embodiment, the electric motor 4 mainly formed of the stator 7 and the rotor 8 has a shorter axial length as compared with the previous embodiments, presenting a generally flat configuration, which realizes a shorter axial size of the whole wheel motor 1, i.e. a shorter size thereof along the output shaft 9.

The rotary shaft 19 of the gear reducer 5 has an end portion 19a thereof rotatably supported in a recess formed in the partition plate member 6d via a bearing 20 formed by a ball bearing or the like, and the other end portion 19b in a recess formed in the outer casing 6A via a bearing 21 formed by a ball bearing or the like, respectively.

Figure 10:
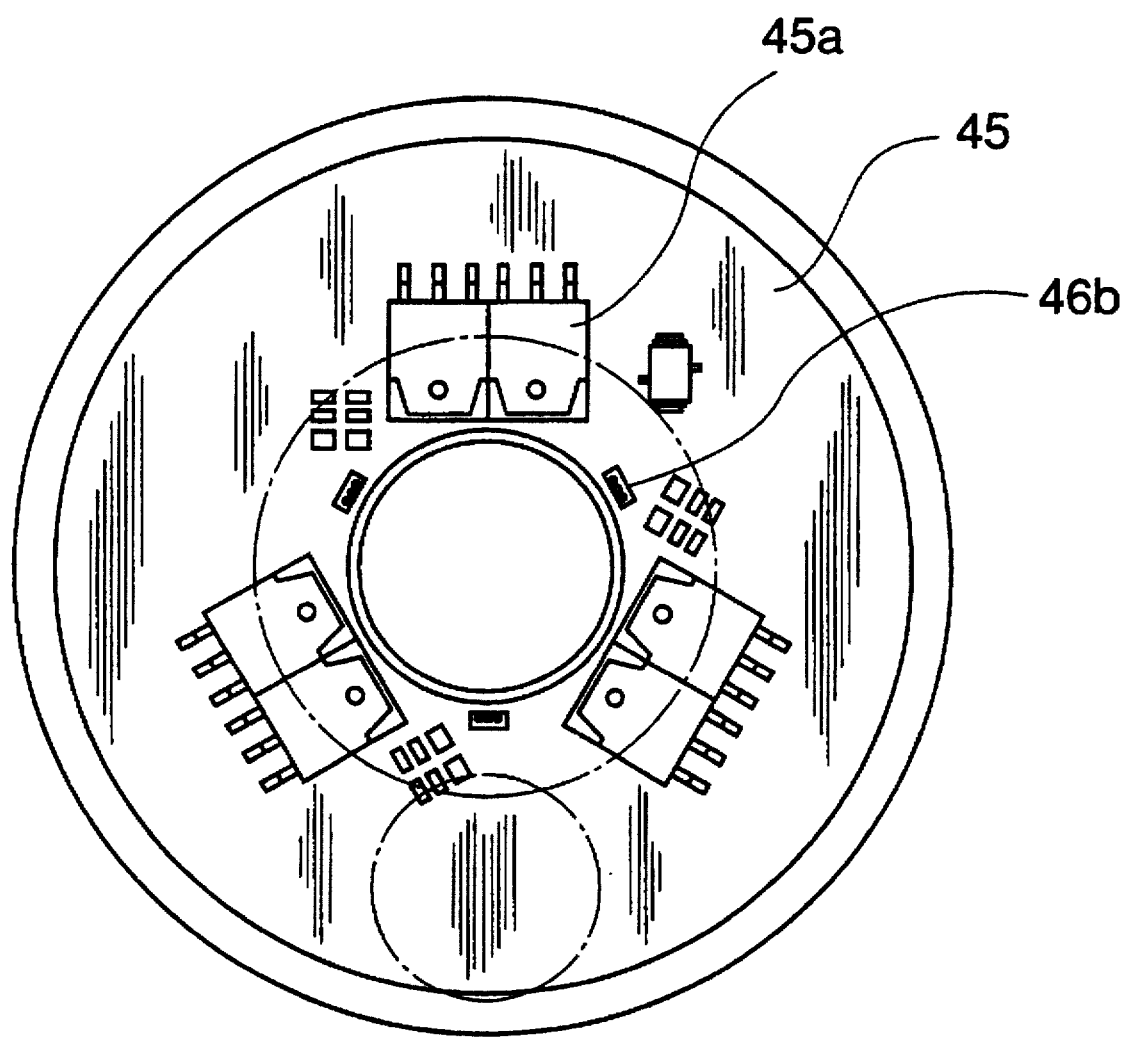
FIG. 10 is a transverse sectional view showing a section in FIG. 7 in which a second circuit board is mounted.

The partition plate member 6d has a central portion thereof formed with a through hole 6f through which the thinned portion 8e of the rotor 8 extends in a fashion being out of contact with the inner wall of the through hole 6f. A first circuit board 43, which forms a control circuit for driving the electric motor 4, is mounted in the space S' defined by the partition plate member 6d and the horseshoe-shaped partition wall 6e of the outer casing 6A and secured to the partition plate member 6d by means of set screws 44, as best shown in FIG. 9. A second circuit board 45 in the form of a doughnut, which forms a driving circuit driven by a signal from the control circuit, for supplying driving current to the electric motor 4, is mounted in a space defined by the reverse side surface of the partition plate member 6d and secured to the plate member 6d by suitable means, not shown, as best shown in FIG. 10. Since the space S' for accommodating the control circuit thus has a horseshoe-shaped configuration, it provides practically a large spatial size for accommodating various circuit component parts of the control circuit, in a limited space within the housing 6. The output shaft 9 of the electric motor 4 and the gear 5c, rotary shaft 19, etc. of the gear reducer 5 are accommodated in a space S" defined inside the space S', by the horseshoe-shaped partition wall 6e, as shown in FIG. 9.

The first circuit board 43, which has a horseshoe-shaped surface configuration, has mounted thereon various circuit component parts 43a forming the control circuit, while the second circuit board 45 has mounted thereon circuit component parts forming the driving circuit for supplying driving current to the field coils 7c, such as a power transistor (power MOSFET) 45a. Insulation film sheets, not shown, are interposed between the partition plate member 6d and the first and second circuit boards 43, 45.

As shown in FIGS. 7 and 10, the position sensor 46 is formed of a ring-like magnet member 46a embedded in an end surface of the rotor 8, and magnetic pole sensor elements 46b mounted on an opposed surface of the second circuit board 45 at circumferentially equal intervals of a predetermined angle (e.g. 120°) at such locations as they can encounter the ring-like magnet member 46a.

The magnetic pole sensor elements 46b may be typically formed by magnetic sensor elements such as a Hall element. But, the position sensor 46 may be any known sensor means including a photo sensor.

Next, the manner of assembling the wheel motor 1 of the present embodiment constructed as above will be described. First, the output shaft 9 is mounted into the outer casing 6A which previously has mounted thereon the bearings 17, 21 and the seal member 47. Then, the second to fourth gears 5b, 5c, 5d of the gear reducer 5 are mounted into the outer casing 6A.

Then, the first and second circuit boards 43, 45, and the stator 7 are mounted onto the partition plate member 6d, followed by wiring therebetween. Then, the partition plate member 6d is fixed to the outer casing 6A by means of the bolts 31. The rotor 8 with the bearings 13a', 13b' previously force fitted therein is then inserted into the stator 7. Finally, the inner casing 6B with the bearing 18 previously fitted therein is mounted onto the partition plate member 6d by means of the bolts 30.

According to the sixth embodiment described above, similarly to the previous embodiments, it is possible to assemble the wheel motor by fitting into respective places the outer casing 6A, the component parts of the gear reducer 5, the partition plate member 6d, the component parts of the electric motor 4, the outer casing 6A, and the inner casing 6B, in the order mentioned, with reference to the output shaft 9, thus facilitating the assemblage. Further, also in this embodiment, the supporting span of the output shaft 9 can be set to a large value, in spite of the shorter axial size of the whole wheel motor 1, thereby obtaining sufficient strength for supporting the wheel 3 with the tire 2 so as to prevent them from falling sideways.

Particularly, according to this embodiment, the control circuit for driving the electric motor 4 is arranged in the space S' defined by the horseshoe-shaped partition wall 6e, whereby the space for mounting the control circuit at a frame of a vehicle body on which the wheel motor 1 is to be mounted is no more required. Besides, the control circuit can be protected against rainwater, mud or the like, as well as against lubricating oil, powder produced due to wear of the gears, etc. splashed by rotation of the output shaft 9, the gear reducer 5, etc. Further, it can be protected against heat radiated from the electric motor 4. Moreover, the number of electric power lines to be wired between the vehicle body frame and the wheel motor 1 can be reduced (e.g. if the electric motor 4 is a three-phase type, the electric power lines can be reduced in number from 3 to 2; and if the motor is grounded to the vehicle body, only one electric power line is required), to thereby reduce the limitation on mounting the wheel motor according to the invention onto bodies of vehicles, in other words, facilitate the installability of the wheel motor onto vehicle bodies, and even make it possible to use the wheel motor in other moving objects than vehicles, i.e. enhance the versatility. Further, since the electric motor 4 is formed by a brushless type with a permanent magnet rotor 8, and the position sensor 46 is arranged on the rotor 8 side, in other words, the position sensor 46 is arranged in the vicinity of the rotor 8 while it is separated from the gear reducer 5, the position sensor 46 is placed in a good environmental condition, whereby it is protected from rainwater, wear powder, etc. similarly to the case of the control circuit, while shorter sensor signal lines can be used between the control circuit and the position sensor, thus preventing noise from being picked up by the sensor signal lines.

Still further, according to the present embodiment, the rotor 8 is rotatably supported on the output shaft 9 via the bearings 13a', 13b', which makes it possible to use bearings with reduced diameters as the bearings 13a', 13b'. Particularly, the employment of a double reduction gear as the gear reducer 5 is advantageous to this arrangement in that the rotor 8 and the output shaft 9 rotate in the same direction, and hence the relative rotational speed difference between them is small, which leads to a reduced abrasion amount.

The present embodiment is substantially identical in construction, operation, and effect with the aforesaid first embodiment, except for those described above, further description of which is therefore omitted.

The present invention is not limited to the above described embodiments, but any modifications and variations thereto are possible within the scope of the appended claims. For example, in the sixth embodiment, the partition wall 6e may be formed integrally with the partition plate member 6d, instead of being formed integrally with the outer casing 6A. Further alternatively, halves of the partition wall 6e may be formed integrally with the outer casing 6A and the partition plate member 6d, respectively, so as to be joined together when the wheel motor is assembled.

What is claimed is:

1. A wheel motor for a vehicle having a vehicle body, comprising:

a wheel having an inner peripheral portion defining a central space therein;

an electric motor arranged in said central space of said wheel, said electric motor generating and outputting a rotative driving force for rotatively driving said wheel; and a gear reducer arranged in said central space of said wheel, said gear reducer having a plurality of gears including a final stage gear having an axial through hole formed therein in coaxial relation to an axis of rotation of said final stage gear;

said electric motor including:

a housing fixed to said vehicle body and having opposite end portions, said gear reducer being accommodated in said housing, a stator secured to said housing and having an inner periphery defining a central space therein, a rotor rotatably fitted in said central space of said stator, said rotor generating said rotative driving force during rotation thereof, and said rotor having an axial through hole formed therein in coaxial relation to an axis of rotation of said rotor, and an output shaft connected through said gear reducer to said rotor to be rotatively driven by said rotor through said gear reducer, said output shaft being drivingly connected to and supporting said wheel for transmitting said rotative driving force generated by said rotor through said gear reducer to said wheel, said output shaft extending through said axial through hole of said final stage gear of said gear reducer which is rigidly fitted on said output shaft, said output shaft extending through said axial through hole of said rotor so as to be out of contact with said rotor, and said output shaft being rotatably supported by said opposite end portions of said housing.

2. A wheel motor as claimed in claim 1, wherein said rotor has an increased diameter portion, and at least one reduced diameter portion provided at least at one end of said increased diameter portion, said at least one reduced diameter portion being rotatably supported by said housing.

3. A wheel motor as claimed in claim 2, wherein said vehicle has at least one axle shaft for supporting said wheel, said output shaft having a hollow interior, said axle shaft being rigidly fitted through said hollow interior of said output shaft.

4. A wheel motor as claimed in claim 2, wherein said output shaft extends through said housing, said output shaft having an extension disposed outside said housing at a side thereof remote from an end of said output shaft connected to said wheel.

5. A wheel motor as claimed claim 1, wherein said vehicle has at least one axle shaft for supporting said wheel, said output shaft having a hollow interior, said axle shaft being rigidly fitted through said hollow interior of said output shaft.

6. A wheel motor as claimed in claim 1, wherein said output shaft extends through said housing, said output shaft having an extension disposed outside said housing for connection with another structure.

7. A wheel motor as claimed in claim 1, including bearing means rotatably supporting said rotor on said output shaft.

8. A wheel motor as claimed in claim 7, wherein said gear reducer comprises a double reduction gear.

9. A wheel motor as claimed in claim 1, wherein said electric motor comprises a brushless electric motor having a permanent magnet rotor forming said rotor, and sensor means for sensing a position of said permanent magnet rotor, said housing comprising a first casing accommodating said electric motor, a second casing accommodating said gear reducer, and a partition member interposed between said first and second casings and separating them from each other, said partition member having first and second surfaces facing said first and second casings, respectively, said gear reducer having at least one gear of at least one predetermined reduction stage disposed in eccentricity with said output shaft, and a rotary shaft supporting said at least one gear of said at least one predetermined reduction stage, said partition member having a first mounting portion formed integrally on said first surface thereof, at which said stator of said electric motor is secured to said housing, and a second mounting portion formed integrally on said first surface thereof, at which said sensor means is mounted in said housing, said partition member having a supporting portion formed integrally on said second surface thereof and supporting said rotary shaft, and said output shaft of said electric motor extending through said partition member and being rotatably supported by said first and second casings.

10. A wheel motor as claimed in claim 9, including a wall formed integrally on at least one of said second casing and said partition member and defining a space between said second casing and said partition member, said space being separated from a space portion of said second casing in which said gear reducer is arranged, and a control circuit accommodated in said space, for driving said electric motor.

11. A wheel motor as claimed in claim 10, wherein said wall defines a space having a horseshoe-shaped configuration as said space, and a second space located inside said first-mentioned space, said second space accommodating said output shaft and said gear reducer.

12. A wheel motor for a vehicle having a vehicle body, comprising:

a wheel having an inner peripheral portion defining a central space;

an electric motor arranged in said central space of said wheel, for generating a rotating output for rotatively driving said wheel;

a gear reducer arranged in said central space of said wheel, said gear reducer having a plurality of gears including a final stage gear having an axial through hole formed therein in coaxial relation to an axis of rotation of said final stage gear;

said electric motor including a housing fixed to said vehicle body and having opposite end portions; a stator secured to said housing and having an inner periphery defining a central space therein, a rotor rotatably fitted in said central space of said stator, for generating said rotative driving force during rotation thereof, said rotor having an axial through hole formed therein in coaxial relation to an axis of rotation of said rotor, and an output shaft connected through said gear reducer to said rotor to be rotatively driven by said rotor, said output shaft being drivingly connected to said wheel for transmitting said rotating output from said rotor through said gear reducer to said wheel, said output shaft extending through said axial through hole of said final stage gear of said gear reducer and said axial through hole of said rotor, said output shaft being rotatably supported by said opposite end portions of said housing; and bearing means rotatably supporting said rotor on said output shaft;

said electric motor comprising a brushless electric motor having a permanent magnet rotor forming said rotor, and sensor means for sensing a position of said permanent magnet rotor, said housing comprising a first casing accommodating said electric motor, a second casing accommodating said gear reducer, and a partition member interposed between said first and second casings and separating them from each other, said partition member having first and second surfaces facing said first and second casings, respectively, said gear reducer having at least one gear of at least one predetermined reduction stage disposed in eccentricity with said output shaft, and a rotary shaft supporting said at least one gear of said at least one predetermined reduction stage, said partition member having a first mounting portion formed integrally on said first surface thereof, at which said stator of said electric motor is secured to said housing, and a second mounting portion formed integrally on said first surface thereof, at which said sensor means is mounted in said housing, said partition member having a supporting portion formed integrally on said second surface thereof and supporting said rotary shaft, said output shaft of said electric motor extending through said partition member and being rotatably supported by said first and second casings.

13. A wheel motor for a vehicle having a vehicle body, comprising:

a wheel having an inner peripheral portion defining a central space therein;

an electric motor arranged in said central space of said wheel, said electric motor generating and outputting a rotative driving force for rotatively driving said wheel; and a gear reducer arranged in said central space of said wheel, said gear reducer having a plurality of gears including a final stage gear having an axial through hole formed therein in coaxial relation to an axis of rotation of said final stage gear;

said electric motor including:

a housing fixed to said vehicle body and having opposite end portions, a stator secured to said housing and having an inner periphery defining a central space therein, a rotor rotatably fitted in said central space of said stator, said rotor generating said rotative driving force during rotation thereof, and said rotor having an axial through hole formed therein in coaxial relation to an axis of rotation of said rotor, and an output shaft connected through said gear reducer to said rotor to be rotatively driven by said rotor through said gear reducer, said output shaft being drivingly connected to and supporting said wheel for transmitting said rotative driving force generated by said rotor through said gear reducer to said wheel, said output shaft extending through said axial through hole of said final stage gear of said gear reducer which is rigidly fitted on said output shaft, said output shaft extending through said axial through hole of said rotor so as to be out of contact with said rotor, and said output shaft being rotatably supported by said opposite end portions of said housing;

wherein said electric motor comprises a brushless electric motor having a permanent magnet rotor forming said rotor, and sensor means for sensing a position of said permanent magnet rotor, wherein said housing comprises a first casing accommodating said electric motor, a second casing accommodating said gear reducer, and a partition member interposed between said first and second casings and separating them from each other, said partition member having first and second surfaces facing said first and second casings, respectively, wherein said gear reducer has at least one gear of at least one predetermined reduction stage disposed in eccentricity with said output shaft, and a rotary shaft supporting at least one gear of said at least one predetermined reduction stage, said partition member having a first mounting position formed integrally on said first surface thereof, at which said stator of said electric motor is secured to said housing, and a second mounting position formed integrally on said first surface thereof, at which said sensor means is mounted in said housing, and said partition member having a supporting position formed integrally on said second surface thereof and supporting said rotary shaft, and wherein said output shaft of said electric motor extends through said partition member and is rotatably supported by said first and second casings.

14. A wheel motor as claimed in claim 13, further comprising a wall formed integrally on at least one of said second casing and said partition member and defining a space between said second casing and said partition member, said space being separated from a space portion of said second casing in which said gear reducer is arranged, and a control circuit accommodated in said space for driving said electric motor.

15. A wheel motor as claimed in claim 14, wherein said wall defines a space having a horseshoe-shaped configuration as said space, and a second space located inside said first-mentioned space, said second space accommodating said output shaft and said gear reducer.

* * * * *